Sept. 30, 1958   I. V. K. HOTT   2,854,094
FRAME ENGAGING VEHICLE LIFT OR HOIST
Filed Nov. 19, 1953   2 Sheets-Sheet 1
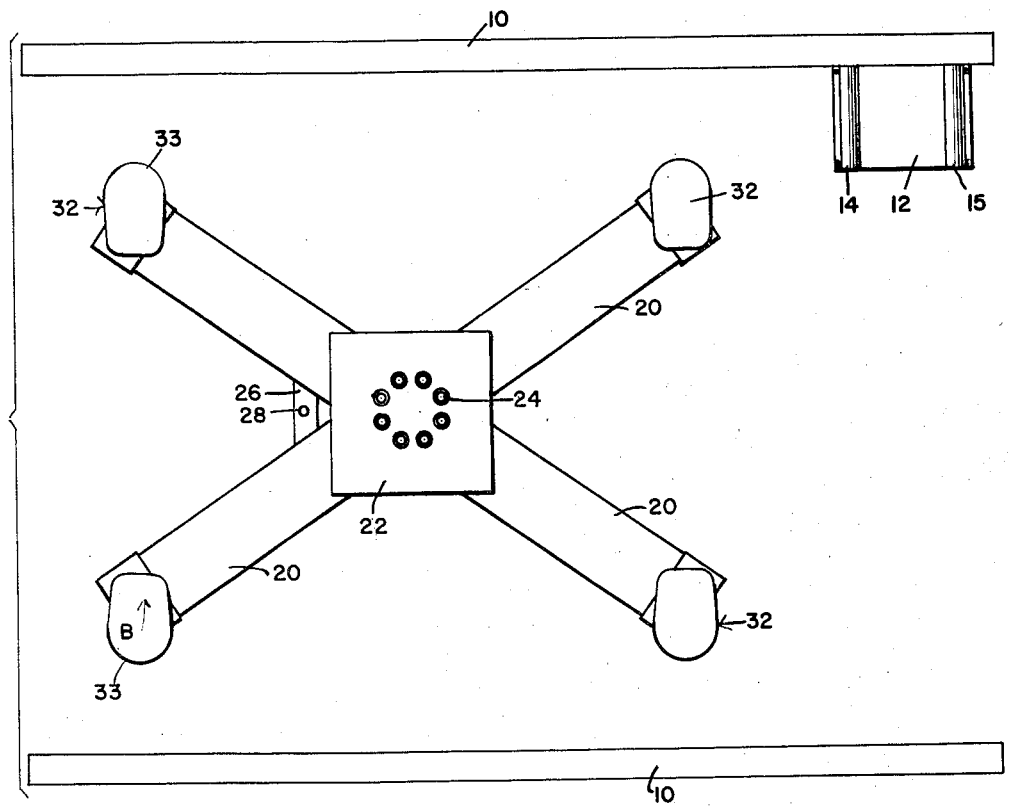
_Fig.1_
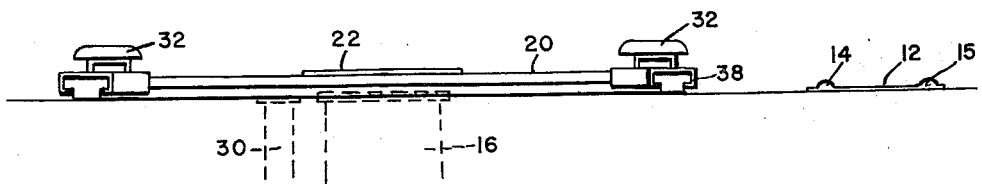
_Fig.2_
INVENTOR.
Jon V. K. Hott Sept. 30, 1958 I. V. K. HOTT 2,854,094
FRAME ENGAGING VEHICLE LIFT OR HOIST
Filed Nov. 19, 1953 2 Sheets-Sheet 2
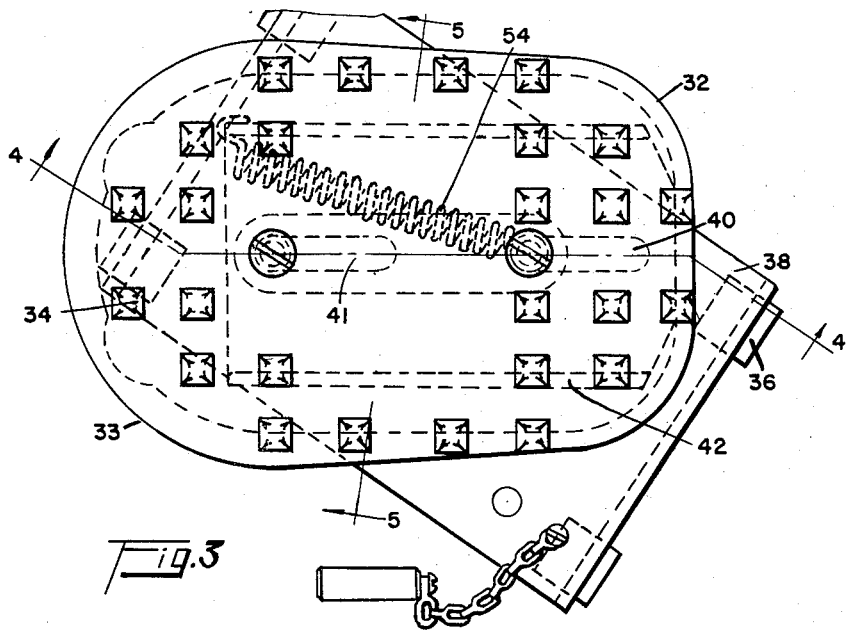
Fig.3
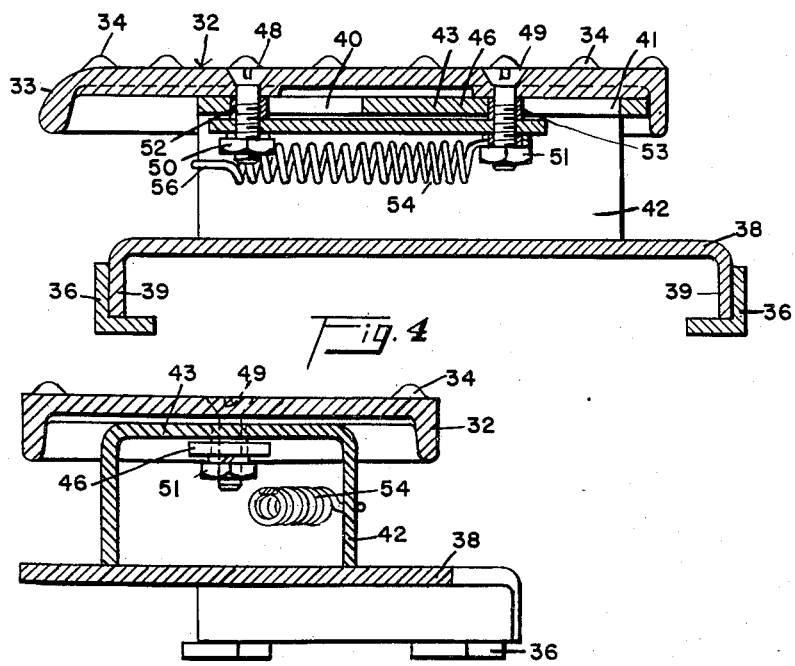
Fig.4
Fig.5
INVENTOR.
Ion V. K. Hott
BY
His Attorneys

United States Patent Office 2,854,094
Patented Sept. 30, 1958

2,854,094

FRAME ENGAGING VEHICLE LIFT OR HOIST

Ion Von Kert Hott, Dayton, Ohio, assignor to The Joyce-Cridland Company, Dayton, Ohio, a corporation of Ohio Application November 19, 1953, Serial No. 393,194

7 Claims. (Cl. 187—8.75)

This invention relates generally to improvements in frame engaging vehicle lifts or hoists, and more particularly illustrated as applied to the X-type hoist shown in my co-pending application, Serial No. 305,558, now abandoned, although not so limited.

One of the main problems encountered in the use of the frame type of vehicle lift is the problem of differing sizes of frames, difference in wheel base, varying placement of the parts of the frame, and the adjustment or removal of load supporting members to provide a path for the wheels while driving upon and off the lift.

An object of the present invention is the provision of vehicle lift which is usable and efficient in lifting cars, trucks, etc. of varying sizes and formations of frames, and of varying wheel bases.

A further object of the invention, in addition to providing for various sizes of vehicles, is the provision of parts which are movable and cushioned which take up shock and diminish damage to tires when impact occurs.

A further object of the invention is the provision of a vehicle hoist of the X-type frame lifts which allows freer access to portions of the underside of an automobile without hindrance such as is encountered in devices of the runway type, and wherein free access to the wheels is possible.

A further object of the invention is the provision of surfaced pads or shoes having a curved contour and movable within limits so as to cushion the impact of tires riding against them. They also serve the purpose of making the device adaptable for use on different makes and sizes of cars.

A further object of the invention is the provision of a novel and ingenious indicating device for guiding and placing a vehicle in the proper position over the hoist. This indicator is so made that it indicates the proper placement of any of the usual sizes of vehicles, as standard, long or short, and can be used in connection with a chart or list of all makes and sizes of cars.

Other objects and advantages reside in the construction of parts, the combination thereof and the mode of operation, as will become more apparent from the following description.

In the drawings, Figure 1 is a top plan schematic view of a vehicle lift.

Figure 2 is a schematic side elevational view.

Figure 3 is a top plan view of one of the four pads or shoes.

Figure 4 is a longitudinal section taken on the line 4—4 of Figure 3, and looking in the direction of the arrows.

Figure 5 is a cross sectional view taken on the line 5—5 of Figure 3, and looking in the direction of the arrows.

Referring to the drawings in detail, a pair of indicating lines 10 are painted or otherwise suitably placed for guiding a vehicle into correct position. Bright colored and oil resistant paint may be used. The use of these lines is optional.

An indicator stop 12 is provided with a rear rib 14 and a forward rib 15. The indicator stop 12 is so placed and its proportions are such that, in order to gain the proper position above the hoist, a car of standard wheel base must come to a stop with its front tire cradled on the indicator between the ribs 14 and 15. This position is used for Chevrolet, Dodge, Ford, etc. Vehicles of longer wheel base such as Buick, Cadillac, etc. will ride completely over the indicator, and come to a stop with a rearward portion of the front tire contacting the front rib 15, while vehicles with the short wheel base such as Nash Rambler and Willys Aero series will come to a stop with the front portion of the front tire contacting the rear rib 14 of the indicator.

A single centrally located hydraulically operated piston or post is shown at 16 in dotted lines in Figure 2. An X-frame is formed of four radially extending and identical arm members 20, and a central member 22, shown as rectangular in the drawing but not limited to this form. The member 22 is welded or otherwise made an integral part of the X-frame. The member 22 is provided with counter sunk openings 24 adapted to receive bolts for securing the X-frame to the post 16.

A brace 26 is secured between two of the radially extending members 20 and is provided with a screw 28 for attachment to a post 30. By this means, the frame is held solidly, and is prevented from rotation and torque movements.

The outward ends of the members 20 are provided with devices of identical formation. The one shown and described is to be considered representative of any one of the four. An inverted U-shaped or channel member 38 is supported upon the upper and edge surfaces of the outward end of each member 20, and is slidably held thereon by means of angle iron brackets 36. The lugs or brackets 36 prevent the channel member 38 from being removed vertically from members 20. The member 38 is thus slidably attached to the arm 20 and the pad or shoe 32 may slide along the arm 20 and be placed thereon at any desirable position.

The upper surface of the inverted U-shaped or channel member 38 has mounted thereon a supporting member 42 welded or otherwise secured thereto. This supporting member 42 is of inverted U-shape in cross section shown best in Figure 5, and is diagonally disposed upon the member 38 best shown in dotted lines in Figure 3. The horizontal upper portion 43 of the supporting member 42 is provided with a pair of slots 40 and 41, thus forming a track member or trackway.

The pads or shoes 32 are mounted for lateral movement on top of the U-shaped supporting member 42. These pads or shoes 32 are guided by bolts 48 and 49 extending through bushings 52 and 53 mounted in the slots 40 and 41 respectively and are retained in position by a retaining plate 46 which is held by the nuts 50 and 51 respectively threadingly engaging the bolts 48 and 49. The bushings 52 and 53 function as spacers holding the retaining plate 46 in fixed spaced relation from the underside of the pad or shoe 32.

A spring 54 is attached at one end to the bolt 49 and is held securely by means of the nut 51. The opposite end of the spring is attached over the edge of the U-shaped member 42. In operation, when the tires of a car proceeding in the direction of the arrow A in Figure 1 encounter the sloping curved surface 33 of the pad 32, this shoe or pad is forced inwardly, and its direction of movement as determined by the direction of the slots 40 and 41 forming a trackway, will be parallel with its own longitudinal length, and inward in the direction of the arrow B in Figure 1. The sloping, rounded surface 33 presents a cushion for the impact of the tire, and the pad member 32 is forced inwardly without damage to the tire. As the vehicle is placed on the lift, the spring controlled pads act as wheel guides.

During this operation, the tension of the spring 54 has been flexed as the shoe 32 is forced inward, until the limit of the slots 40 and 41 has been reached. When the tire has passed beyond the pad or shoe 32 the shoe 32, actuated by the spring 54, returns outwardly to its former position. The upper surface of the shoe is provided with projections 34 which provide friction for gripping the vehicle frame.

It will thus be seen that the spread of the X-frame which supports the frame of the car is several inches more than could be realized if it were confined to the actual width between the wheels of the car. Accommodation is thus made for differences in the placement of the different parts of the frame of the vehicle as, for example, when a portion of the frame is located on a line with and between the front and rear wheels. Differences in sizes of vehicles is thus also provided for.

A pair of angle irons 36 receive downwardly depending flanges 39 of the member 38, and form means slidably securing the member 38 to the radially extending member 20.

As all makes of automobiles do not have the same type of frame structure, do not have the same wheel base, and do not have the same arrangement of parts projecting downwardly from the frame, it is necessary to adjust the pads 32 together with their supporting assembly upon the support members 20. For example, one make of car may have a comparatively wide frame near the rear wheels and a much narrower frame near the front wheels. In that event, the pads underlying the front part of the frame may be adjusted toward the center of the hoist so as to provide a shorter distance between the two front pads to accommodate the narrower frame. The X-frame type of support lends itself to adjustments both lengthwise and crosswise as far as the pads are concerned.

The pads or shoes 32 are not limited in their use to X-frame type of lifts in that these pads or shoes 32 may be supported upon frame lifts having a pair of parallel and laterally spaced frame engaging members. These frame engaging members are spaced so that when the car is driven upon the frame lift, the tires or wheels clear the laterally spaced members. The pads, as they project into the paths of the tires, are automatically moved inwardly so as to provide a clearance for the tires.

It will thus be seen that the device is strong and sturdy, easily and economically made, easy to operate, has maximum safety factor, and lends itself to a very wide range of uses.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described my invention, I claim:

1. In a frame engaging vehicle lift or hoist, lifting means movable in a vertical direction, a frame, means for securing said frame to said lifting means, shoes resiliently and slidably mounted for movement in a horizontal direction, said shoes engaging and supporting the frame of a vehicle, and adapted under impact of the tire of a car to slide horizontally out of the path of the tire, and means for returning the shoes when the tire has passed.

2. A frame engaging vehicle lift or hoist as claimed in claim 1 wherein said shoes are provided with circumferentially rounded and vertically curved surfaces for cushioning the impact of the tire.

3. In a frame engaging vehicle lift or hoist the device set forth in claim 1 wherein said shoes are provided on their upper surfaces with friction means for aiding in gripping the frame of a vehicle.

4. In a frame engaging vehicle lift or hoist, lifting means, a central plate member, means for securing said plate member to said lifting means, radially extending arm members secured to said plate member to form an X-frame, track members positioned adjacent the ends of said arms, resiliently slidable shoes mounted on said track members for engaging and supporting the frame of a vehicle, said shoes being adapted to move horizontally under impact of a tire of a vehicle being moved to position over said lift, and resilient means to returning the shoes when the tire has passed.

5. In a frame engaging vehicle lift or hoist, lifting means, a plate, means for securing said plate to said lifting means, arm members secured to said plate to form an X-frame, each arm member being provided with an end plate, a diagonally placed trackway mounted on said end plate, a pad mounted for sliding movement on said trackway, a spring for holding the pad in outward position and for returning it to its outward position after being pushed inwardly.

6. In a device of the character described, a shoe adapted to engage and support the frame of a vehicle, a frame member, lifting means, and means for attaching said frame member to said lifting means, said shoe being slidably and resiliently mounted on said frame member and provided with curved and rounded portions at its edge for cushioning impact of a tire therewith, said shoe also being provided with frictional means for aiding in gripping the vehicle frame.

7. In a frame engaging vehicle lift or hoist, lifting means, arm members secured to said lifting means, said arm members extending radially from said lifting means, sliding members attached to each of said arm members, said sliding members when moving away from the lifting means moving outwardly from each other, a track member on each of said sliding members, said track member forming an acute angle with respect to the longitudinal axis of the arm member so that all of the track members remain parallel at all times, a vehicle frame engaging shoe slidably mounted on each of said track members for horizontal movement, said shoe being slidable along said arms, and also slidable in said track member.

References Cited in the file of this patent

UNITED STATES PATENTS

| | | |
|---|---|---|
| 1,819,275 | Ackerman | Aug. 18, 1931 |
| 2,139,597 | Martin | Dec. 6, 1938 |
| 2,424,673 | Thompson | July 29, 1947 |
| 2,533,981 | Weaver | Dec. 12, 1950 |
| 2,581,137 | Pelouch | Jan. 1, 1952 |
| 2,593,635 | Walker | Apr. 22, 1952 |
| 2,612,344 | Thompson | Sept. 30, 1952 |
| 2,708,988 | Hott et al. | May 24, 1955 |

FOREIGN PATENTS

| | | |
|---|---|---|
| 497,847 | Belgium | Dec. 26, 1950 |